US012560800B2

(12) United States Patent
Kang et al.

(10) Patent No.: US 12,560,800 B2
(45) Date of Patent: Feb. 24, 2026

(54) COLOR WHEEL

(71) Applicant: LG ELECTRONICS INC., Seoul (KR)

(72) Inventors: Bokyung Kang, Seoul (KR); Gunyoung Hong, Seoul (KR); Younggil Yoo, Seoul (KR); Minsung Kim, Seoul (KR); Kyungpil Kim, Seoul (KR); Seungmi Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 653 days.

(21) Appl. No.: 17/796,466

(22) PCT Filed: Jan. 31, 2020

(86) PCT No.: PCT/KR2020/001490
§ 371 (c)(1),
(2) Date: Jul. 29, 2022

(87) PCT Pub. No.: WO2021/153827
PCT Pub. Date: Aug. 5, 2021

(65) Prior Publication Data
US 2023/0066523 A1 Mar. 2, 2023

(51) Int. Cl.
*G02B 26/00* (2006.01)
*H04N 9/31* (2006.01)
(Continued)

(52) U.S. Cl.
CPC ......... *G02B 26/008* (2013.01); *H04N 9/3117* (2013.01); *H04N 9/3158* (2013.01); *C09K 11/62* (2013.01); *C09K 11/7721* (2013.01)

(58) Field of Classification Search
CPC .. G02B 26/008; H04N 9/3117; H04N 9/3158; H04N 9/31; C09K 11/62; C09K 11/7721; C09K 11/7774; G03B 21/204
(Continued)

(56) References Cited

U.S. PATENT DOCUMENTS

2012/0153226 A1* 6/2012 Comanzo ............. C09K 11/663
252/301.6 F
2012/0201030 A1 8/2012 Yuan et al.
(Continued)

FOREIGN PATENT DOCUMENTS

EP 3543221 9/2019
JP 2016138020 8/2016
KR 10-1415956 7/2014

OTHER PUBLICATIONS

European Patent Office Application Serial No. 20917140.4, Search Report dated Sep. 28, 2023, 5 pages.
(Continued)

*Primary Examiner* — Magda Cruz
(74) *Attorney, Agent, or Firm* — LEE, HONG, DEGERMAN, KANG & WAIMEY

(57) ABSTRACT

A color wheel according to an embodiment of the present invention comprises: a basic fluorescent body having a basic light-emitting wavelength; and at least one modified fluorescent body having at least one light-emitting wavelength different from the basic light-emitting wavelength, wherein the basic fluorescent body comprises $Y_3Al_5O_{12}$ and the modified fluorescent body comprises $Y_3(Ga_xAl_{(1-x)})_5O_{12}:Ce$ in which gallium is doped on the basic fluorescent body.

9 Claims, 4 Drawing Sheets

100

(51) Int. Cl.
    *C09K 11/62*        (2006.01)
    *C09K 11/77*        (2006.01)

(58) Field of Classification Search
    USPC ........................................................... 353/84
    See application file for complete search history.

(56)                References Cited

U.S. PATENT DOCUMENTS

| | | |
|---|---|---|
| 2012/0313124 A1 | 12/2012 | Clatterbuck et al. |
| 2014/0254133 A1* | 9/2014 | Kotter ...................... F21V 9/38 |
| | | 29/428 |
| 2014/0339593 A1 | 11/2014 | Clatterbuck et al. |
| 2018/0332258 A1 | 11/2018 | Akiyama et al. |

OTHER PUBLICATIONS

PCT International Application No. PCT/KR2020/001490, International Search Report dated Oct. 22, 2020, pages.

\* cited by examiner $Y_3(Ga_x,Al_{1-x})_5O_{12}:Ce$

Resin

COLOR WHEEL

CROSS-REFERENCE TO RELATED APPLICATIONS

This application is the National Stage filing under 35 U.S.C. 371 of International Application No. PCT/KR2020/ 001490, filed on Jan. 31, 2020, the contents of which are hereby incorporated by reference herein its entirety.

BACKGROUND OF THE DISCLOSURE

1. Field of the Disclosure

The present disclosure relates to a color wheel, and more particularly, to a color wheel in which a composition of a phosphor is controlled.

2. Description of the Related Art

A color wheel is a device used in an image display device, such as a projector, and may include a phosphor that converts a wavelength of incident light and emits it.

The color wheel may include a plurality of phosphors to convert incident light into various wavelength bands in order to improve the quality of an image to be displayed.

Japanese patent JP2017-160578A discloses a phosphor color wheel for projector that includes a YAG:Ce phosphor and a LuAg:Ce phosphor.

In the phosphor color wheel for projector, a light source radiates light to the phosphor wheel, and converts the light to which phosphor particles in the phosphor are irradiated into a specific wavelength and emit it.

However, the phosphor composition included in the phosphor color wheel for projector has a problem in that the emission intensity of phosphor is not good, and when a temperature is increased due to a high output, the emission intensity is decreased.

SUMMARY

The technical problem to be solved by the present disclosure will be described as follows.

First, the present disclosure is to provide a color wheel having improved luminescence intensity.

Second, the present disclosure is to provide a color wheel in which a decrease in luminescence intensity due to an increase in temperature is reduced.

In addition, the present disclosure is to solve all problems that can be generated or predicted from the prior art in addition to the technical problems described above.

A color wheel according to the present disclosure includes a basic phosphor and a modified phosphor obtained by doping gallium into the basic phosphor.

Specifically, the basic phosphor includes Y3Al5O12, and the modified phosphor includes $Y_3(Ga_xAl_{(1-x)})_5O_{12}$:Ce in which gallium is doped into the basic phosphor.

The x ranges from 0.01 to 0.6.

The modified phosphor comprises a plurality of modified phosphors, and each of the plurality of modified phosphors has a different x value.

The modified phosphor forms a solid solution by substituting gallium with at least a portion of aluminum in the basic phosphor.

The color wheel further includes a substrate on which the basic phosphor and the modified phosphor are disposed, and the substrate is partitioned and includes a basic phosphor area on which the basic phosphor is disposed and a modified phosphor area on which the modified phosphor is disposed.

The number of the basic phosphor area and the modified phosphor area are equal to or greater than the number of types of the basic phosphor and the modified phosphor.

The basic phosphor area and the modified phosphor area are formed in a ring shape, based on a rotation axis of the substrate.

A sum of central angle of the basic phosphor area compared to a sum of central angles of the basic phosphor area and the modified phosphor area ranges from about 20° to about 340°, and a sum of central angle of the modified phosphor area compared to the sum of central angles of the basic phosphor area and the modified phosphor area ranges from about 20° to about 340°.

The modified phosphor includes a plurality of modified phosphors having different gallium contents, the modified phosphor area includes a plurality of modified phosphor small areas in which each of the plurality of modified phosphors having different gallium contents is disposed, and the modified phosphor small area has a different central angle according to a gallium content of the modified phosphor.

The modified phosphor comprises $Y_3(Ga_xAl_{(1-x)})_5O_{12}$:Ce $(0.1 \leq x \leq 0.2)$ and $Y_3(Ga_xAl_{(1-x)})_5O_{12}$:Ce $(0.4 \leq x \leq 0.5)$.

Effects of the Disclosure

The effect of the color wheel in the present disclosure configured as described above is as follows.

The color wheel of the present disclosure includes a modified phosphor doped with gallium to not only improve the luminescence intensity, but also reduce the decrease in luminescence intensity due to an increase in temperature.

DETAILED DESCRIPTION OF THE PREFERRED EMBODIMENTS

Figure 1:
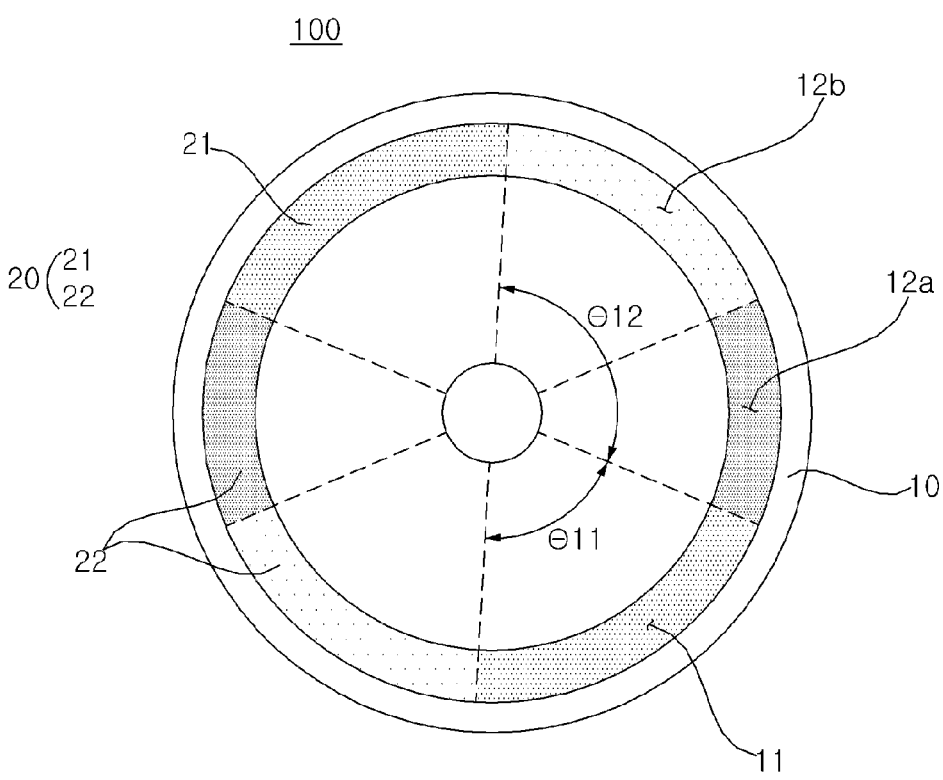
FIG. 1 is a front view of a color wheel according to an embodiment of the present disclosure.

Advantages and features of the present disclosure and methods of achieving them will become apparent with reference to the embodiments described below in detail.

The present disclosure is defined by the scope of the claims, and if there is a separate description for the meaning of a term in the specification, the meaning of the term will be defined by the above description. Like reference numerals refer to like elements throughout.

The color wheel 100 of the present disclosure includes a basic phosphor 21 that converts incident light into a basic emission wavelength and emits it, and at least one modified phosphor 22 doped with gallium including at least one emission wavelength different from the basic emission wavelength.

Figure 3:
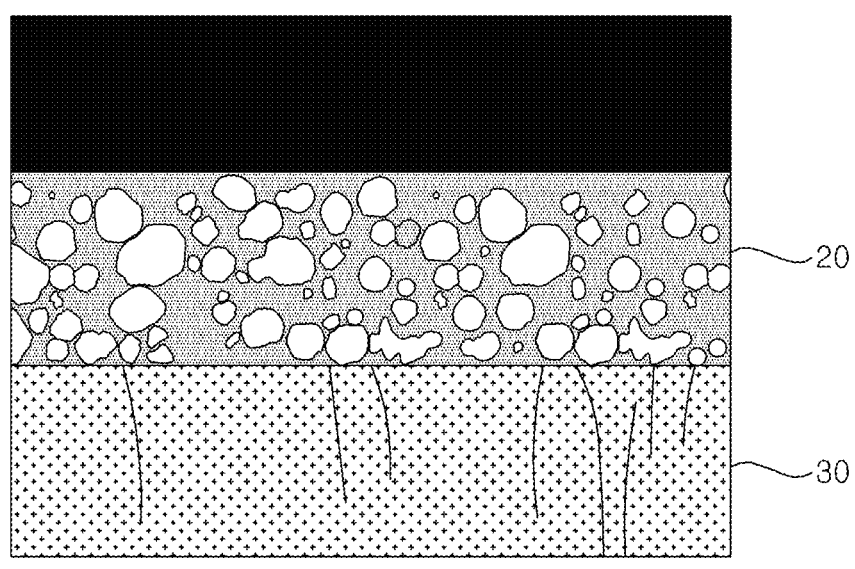
FIG. 3 is a partially enlarged cross-section of a color wheel according to an embodiment of the present disclosure.
Figure 3:
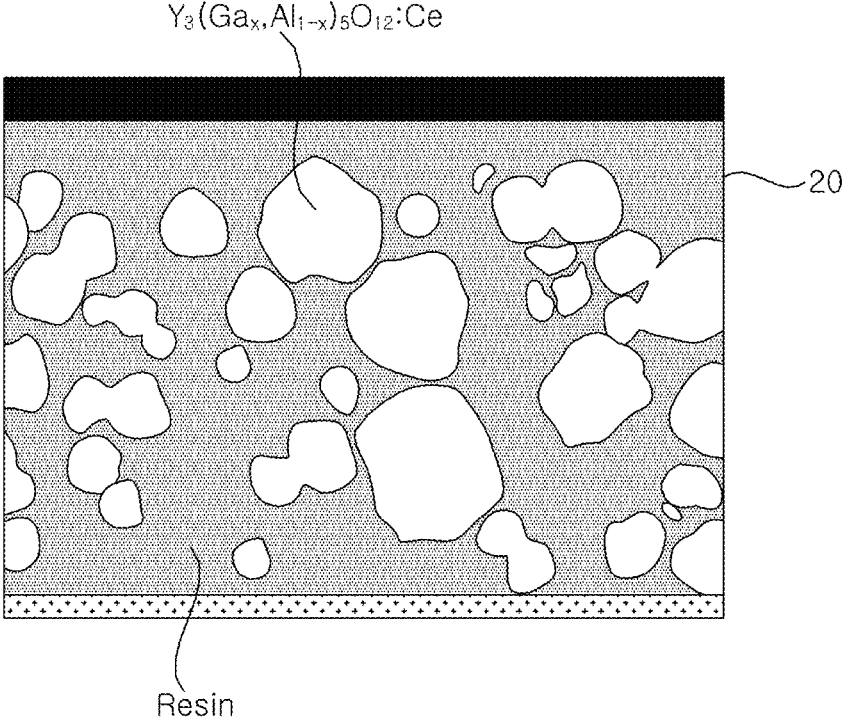

In this regard, a color wheel 100 according to an embodiment of the present disclosure will be described with reference to FIGS. 1 and 3.

Figure 2:
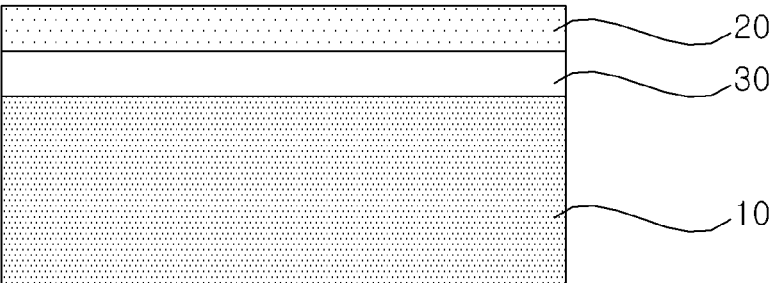
FIG. 2 is a cross-sectional view of a color wheel according to an embodiment of the present disclosure.

First, referring to FIGS. 1 and 2, the color wheel 100 includes a plate-shaped substrate 10 and a phosphor layer 20 disposed on the substrate 10, and a reflective layer 30 disposed between the substrate 10 and the phosphor layer 20.

Specifically, the substrate 10 forms a basic structure of the color wheel 100, and may be a ring-shaped or circular-shaped member. The substrate 10 may rotate in one direction based on a central rotation axis, and the phosphor layer 20 to be described later may be rotated together by the rotation of the substrate 10.

However, the shape of the substrate 10 is not limited to the description and the shape shown in drawing, and may include a shape applicable to a color wheel shape by a person skilled in the art.

The substrate 10 may include at least one of aluminum Al, iron Fe, and copper Cu, and may include aluminum having good thermal conductivity because, for example, high energy light is irradiated to increase the temperature.

However, the constituent material of the substrate 10 is not limited to the above description, and may include all materials applicable to the color wheel 100 by a person skilled in the art within a range having good thermal conductivity and reflectivity.

A reflective layer 30 may be disposed between the substrate 10 and the phosphor layer 20.

The reflective layer 30 may have an adhesive property so that the phosphor layer 20 can be firmly coupled to the substrate 10, and at the same time, have a reflective property to improve light conversion efficiency of the phosphor layer 20.

Specifically, the reflective layer 30 may include at least one of resin, silver Ag, and titanium oxide TiO2.

For example, a reflective layer composed of titanium oxide powder and resin may be applied, or a substrate having a surface deposited with silver may be applied as the reflective layer.

However, the constituent material of the reflective layer 30 is not limited to the above description, and may include a constituent material within a range that can be easily design-changed by a person skilled in the art.

The color wheel 100 according to the embodiment of the present disclosure can implement the effect of excellent luminescence intensity and reduced luminescence intensity degradation at high temperatures, by adjusting the composition of the phosphor included in the phosphor layer 20.

In this regard, the phosphor layer 20 will be described in detail with reference to FIGS. 1, 3 and 4.

The phosphor layer 20 may be irradiated by a light source, and each of the phosphors 21 and 22 included in the phosphor layer 20 may absorb incident light, convert it to a specific wavelength, and then emit it.

Specifically, the phosphor layer 20 may include a basic phosphor 21 having a basic emission wavelength and at least one modified phosphor 22 having at least one emission wavelength different from the basic emission wavelength.

First, the basic phosphor 21 may be a phosphor including YAG:Ce including yttrium, aluminum Al, and garnet to which cerium Ce is added.

In detail, the empirical formula of the basic phosphor 21 may be Y3Al5O12, and 3, 5, and 12 in the empirical formula means at % which is the number of elements occupied by each element in comparison with the total number of atoms.

Cerium is included in a very trace amount, and may be, for example, 0.15 at % as about 0.6 at % or less.

In the present specification, the fact that the basic phosphor 21 is a phosphor including Y3Al5O12 (YAG:Ce) may mean that it is a phosphor obtained by mixing and hardening Y3Al5O12 phosphor powder with a resin.

In addition, the phosphor including Y3Al5O12 included in the basic phosphor 21 may have an average particle size of about 10 μm to about 50 μm.

The basic phosphor 21 absorbs incident light, converts it to a basic emission wavelength, and emits it, for example, emits yellow-series light.

Meanwhile, the color wheel 100 according to the embodiment of the present disclosure may include not only the basic phosphor 21 but also at least one modified phosphor 22 having at least one emission wavelength different from the basic emission wavelength.

Specifically, the color wheel 100 according to the embodiment of the present disclosure may include a plurality of modified phosphors 22 having different gallium contents, and the emission wavelength is also varied because the content of gallium included in each of the plurality of modified phosphors 22 is varied.

That is, the color wheel 100 includes at least one modified phosphor 22 together with the basic phosphor 21, thereby emitting light having a basic emission wavelength and an emission wavelength different from the basic emission wavelength.

A detailed description of the composition of the plurality of modified phosphors 22 will be described later.

The modified phosphor 22 may include Y3(GaxAl(1-x))5O12:Ce in which the basic phosphor 21 is doped with gallium Ga.

In the present specification, the fact that the modified phosphor 22 is a phosphor including Y3Al5O12 doped with Ga may mean that it is a phosphor obtained by mixing and hardening Y3Al5O12 phosphor powder doped with Ga with a resin.

In addition, the phosphor including $Y_3Al_5O_{12}$ doped with Ga included in the modified phosphor 21 may have an average particle size of about 10 μm to about 50 μm.

Specifically, the modified phosphor 22 may be in a state in which gallium Ga is substituted with at least a portion of aluminum of the basic phosphor 21 to form a solid solution.

Furthermore, the ratio of the element of substituted gallium to the total element of aluminum, the x value in the empirical formula of the modified phosphor 22 may be about 0.01 to about 0.6.

The modified phosphor 22 may be doped with gallium so that the x value in the empirical formula is about 0.01 to about 0.6, thereby changing the emission wavelength and the emission intensity of the modified phosphor 22.

As a result, the emission intensity of the color wheel 100 including the basic phosphor 21 and the modified phosphor 22 can be remarkably improved, and as the output of the incident light increases, the decrease in the emission intensity can be effectively reduced even when the temperature increases.

Meanwhile, as described above, since the color wheel 100 may include a plurality of modified phosphors 22, the modified phosphor 22 included in the embodiment of the present disclosure may be composed of a plurality of modified phosphors 22 having different x values when x ranges from 0.01 to 0.6.

For example, the modified phosphor 22 may be composed of a plurality of modified phosphors 22 having different gallium ratios such as $Y_3(Ga_{0.1}, Al_{0.9})_5O_{12}$:Ce (x=0.1), $Y_3(Ga_{0.4}, Al_{0.6})_5O_{12}$:Ce (x=0.4), $Y_3(Ga_{0.6}, Al_{0.4})_5O_{12}$:Ce (x=0.6).

In the modified phosphor 22, as the x value in the empirical formula increases within the range of about 0.01 to about 0.6, the emission wavelength can move from the yellow series to the green series.

The color wheel 100 according to the embodiment of the present disclosure includes at least one modified phosphor 22 having a different gallium doping ratio, thereby improving the quality of an image finally implemented by the projector by diversifying the wavelength band of light that can be implemented through the color wheel 100.

In addition, the color wheel 100 according to the embodiment of the present disclosure includes a plurality of modified phosphors 22 having different gallium doping ratios, thereby further improving the luminescence intensity, and more effectively reducing a decrease in luminescence intensity due to a rise in temperature.

For example, when the color wheel 100 includes a first modified phosphor 22 having x in the range of about 0.1 to 0.2 in the empirical formula and a second modified phosphor 22 having x in the range of about 0.4 to 0.5, the luminescence intensity can be further improved, in comparison with a case of including only one type of modified phosphor 22.

Next, the disposition structure of the basic phosphor 21 and at least one modified phosphor 22 will be described.

Referring back to FIG. 1, the substrate 10 may be partitioned to have a certain central angle with respect to the rotation axis of the substrate, and the partitioned substrate may include a basic phosphor area 11 on which the basic phosphor 21 is disposed, and a modified phosphor area 12 in which the modified phosphor 22 is disposed.

Since the basic phosphor 21 or the modified phosphor 22 may be spaced apart from each other and disposed in plurality on the substrate, the number of the basic phosphor area 11 and the modified phosphor area 12 may be the same as or more than the number of the types of the basic phosphor 21 and the modified phosphor 22 (in the case of the modified phosphor 22, the modified phosphor 22 having the same x value in the empirical formula is determined as one type, and the modified phosphor 22 having a different x value is determined as another type).

A plurality of the basic phosphor 21 or the modified phosphor 22 having the same type may be respectively disposed on the substrate, and may be disposed in contact with each other or spaced apart from each other when a plurality of basic phosphors 21 or modified phosphors 22 having the same type are disposed on the substrate.

For example, the basic phosphor area 11 and the modified phosphor area 12 may be formed of each part of an annular shape based on the rotation axis of the substrate 10. That is, an annular area of a certain width is formed around the rotation axis of the substrate 10, and the annular area is partitioned and divided to have a certain central angle to become the basic phosphor area 11 and the modified phosphor area 12.

However, the shapes of the basic phosphor area 11 and the modified phosphor area 12 are not limited to the above description and the structures shown in drawing, and as long as the shape can surround the central axis based on the rotation axis of the substrate 10, it can be said that it includes a shape or structure that can be easily designed and changed by a person skilled in the art.

As described above, the basic phosphor 21 may be disposed in the basic phosphor area 11 and the modified phosphor 22 may be disposed in the modified phosphor area 12. Meanwhile, in the color wheel 100 according to the embodiment of the present disclosure, the basic phosphor area 11 and the modified phosphor area 12 may be configured at a certain ratio.

Specifically, the sum of the central angle θ11 of the basic phosphor area compared to the sum of the central angle θ11 of the basic phosphor area and the central angle θ12 of the modified phosphor area may be about 20° to about 340°, and the sum of the central angle θ11 of the modified phosphor area compared to the sum of the central angle θ11 of the basic phosphor area and the central angle θ12 of the modified phosphor area may be about 20° to about 340°.

That is, the ratio occupied by the basic phosphor area 11 in 360° may be about 1/18 to about 17/18, and conversely, the ratio occupied by the modified phosphor area 12 may be about 17/19 to about 1/18.

In the color wheel 100 according to the embodiment of the present disclosure, the basic phosphor area 11 and the modified phosphor area 12 are configured in the above ratio, thereby improving the luminescence intensity of the color wheel 100.

Furthermore, as described above, the modified phosphor 22 may include a plurality of modified phosphors having different gallium contents, and the modified phosphor area 12 may be disposed by classifying modified phosphors having different gallium contents by type.

Specifically, the modified phosphor area 12 may include a plurality of modified phosphor small areas 12a and 12b in which a plurality of modified phosphors having a different gallium content are disposed respectively.

In the present specification, the number of the modified phosphor small areas 12a and 12b is not limited to the description and the contents disclosed in drawing, but includes a range that can be easily designed and changed by a person skilled in the art.

For example, the modified phosphor small area 12a may be one, may be two 12a and 12b, or may be plural, e.g., three or more. When there are a plurality of modified phosphor small areas, e.g., three or more modified phosphor small areas, reference numerals may be denoted as 12a, 12b, 12c.

The modified phosphor small area 12a, 12b may have a different central angle depending on the gallium content of the modified phosphor 22, and the modified phosphors 22 of the same type having the same gallium content may have the same central angle of the modified phosphor small area 12a.

When a plurality of modified phosphors 22 having different gallium contents are included, the central angle of the modified phosphor small area 12a, 12b is differently configured according to the content of gallium, thereby implementing a difference in color characteristics such as color coordinates and brightness ratio and a difference in emission intensity between each of the basic phosphors 21 and the modified phosphors 22, and implementing a color wheel that effectively satisfies the required color characteristics due to such a difference, while having an excellent luminous intensity.

Next, the characteristics and effects of the color wheel 100 according to the embodiment of the present disclosure will be described in detail with reference to Tables 1, 2, and 4 below.

TABLE 1

| | Phosphor composition | | | |
| Category | Basic phosphor | First modified phosphor | Second modified phosphor | Relative luminance |
|---|---|---|---|---|
| Embodiment 1 | $Y_3Al_5O_{12}$:Ce | $Y_3(Ga_x, Al_{1-x})_5O_{12}$:Ce (x = 0.1) | $Y_3(Ga_x, Al_{1-x})_5O_{12}$:Ce (x = 0.4) | 100% |
| Embodiment 2 | $Y_3Al_5O_{12}$:Ce | $Y_3(Ga_x, Al_{1-x})_5O_{12}$:Ce (x = 0.1) | $Y_3(Ga_x, Al_{1-x})_5O_{12}$:Ce (x = 0.6) | 97% |
| Embodiment 3 | $Y_3Al_5O_{12}$:Ce | $Y_3(Ga_x, Al_{1-x})_5O_{12}$:Ce (x = 0.3) | $Y_3(Ga_x, Al_{1-x})_5O_{12}$:Ce (x = 0.4) | 98% |
| Embodiment 4 | $Y_3Al_5O_{12}$:Ce | — | $Y_3(Ga_x, Al_{1-x})_5O_{12}$:Ce (x = 0.4) | 98% |
| Comparative example 1 | $Y_3Al_5O_{12}$:Ce | — | $Lu_3Al_5O_{12}$:Ce | 87% |

TABLE 2

| | Center angle | | |
| Category | Basic phosphor area | First modified phosphor area | Second modified phosphor area |
|---|---|---|---|
| Embodiment 1 | 54° | 61° | 65° |
| Embodiment 2 | 54° | 61° | 65° |
| Embodiment 3 | 54° | 61° | 65° |
| Embodiment 4 | 115° | | 65° |
| Comparative Example 1 | 115° | | 65° |

Referring to Tables 1 and 2, in contrast to Comparative examples, embodiments 1 to 4 include one or two modified phosphors 22 doped with gallium together with the basic phosphor 22.

At the same time, when two modified phosphors 22 are included, the modified phosphor area 12b in which the modified phosphor 22 having a high gallium content (x value is relatively high in the empirical formula) is controlled to have a greater central angle than the modified phosphor area 12b in which the modified phosphor 22 having a low gallium content.

As a result, it can be checked that the luminescence intensity of embodiments 1 to 4 are significantly increased compared to comparative example 1.

Furthermore, when different types of modified phosphors 22 having different gallium contents are included, the luminescence intensity can be further improved by controlling the respective gallium content (x value of the empirical formula) and the angle of the modified phosphor small area 12a, 12b.

Figure 4:
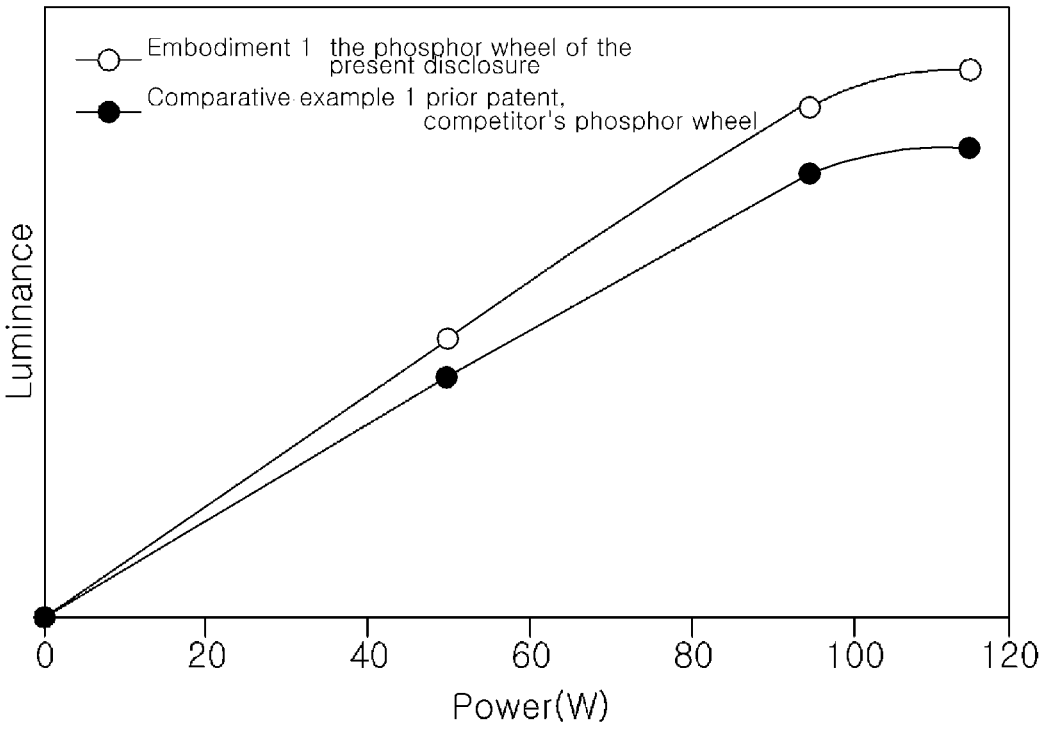
FIG. 4 is a graph showing the luminescence intensity according to an output of a color wheel according to an embodiment and a comparative example of the present disclosure.

Meanwhile, in FIG. 4, embodiment 1 and comparative example 1 are compared for luminescence intensity according to the output (POWER) of the incident light.

Referring to FIG. 4, in comparative example 1, as the output of the incident light increases, the temperature of the phosphor also increases, so that the emission intensity of the phosphor decreases to a certain level or lower.

On the other hand, in the color wheel 100 according to embodiment 1 of the present disclosure, the temperature of the phosphor increases as the output of the incident light increases, but the decrease in luminescence intensity is reduced. Accordingly, it can be checked that the luminescence intensity significantly superior to that of comparative example 1 can be maintained.

Although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

What is claimed is:

1. A color wheel comprising:
a basic phosphor having a basic emission wavelength;
at least one modified phosphor having at least one emission wavelength different from the basic emission wavelength; and
a substrate on which the basic phosphor and the modified phosphor are disposed,
wherein the substrate comprises a basic phosphor area on which the basic phosphor is disposed and a modified phosphor area on which the modified phosphor is disposed,
wherein the basic phosphor comprises $Y_3Al_5O_{12}$,
wherein the modified phosphor comprises $Y_3(Ga_xAl_{(1-x)})_5O_{12}$:Ce in which gallium is doped into the basic phosphor,
wherein the modified phosphor comprises a plurality of modified phosphors having different gallium contents,
wherein the modified phosphor area comprises a plurality of modified phosphor small areas in which each of the plurality of modified phosphors having different gallium contents is disposed, and
wherein each of the modified phosphor small areas has a different central angle according to a gallium content of the modified phosphor.

2. The color wheel of claim 1, wherein a value of x ranges from 0.01 to 0.6.

3. The color wheel of claim 1, wherein the modified phosphor comprises a plurality of modified phosphors, and each of the plurality of modified phosphors has a different x value.

4. The color wheel of claim 1, wherein the modified phosphor forms a solid solution by substituting gallium with at least a portion of aluminum in the basic phosphor.

5. The color wheel of claim 1, wherein a number of the basic phosphor area and the modified phosphor area are equal to or greater than a number of types of the basic phosphor and the modified phosphor.

6. The color wheel of claim 1, wherein the basic phosphor area and the modified phosphor area are formed in a ring shape, based on a rotation axis of the substrate.

7. The color wheel of claim 1, wherein
a sum of central angle of the basic phosphor area compared to a sum of central angles of the basic phosphor area and the modified phosphor area ranges from about 20° to about 340°, and a sum of central angle of the modified phosphor area compared to the sum of central angles of the basic phosphor area and the modified phosphor area ranges from about 20° to about 340°.

8. The color wheel of claim 1, wherein the modified phosphor comprises $Y_3(Ga_xAl_{(1-x)})_5O_{12}$:Ce $(0.1 \leq x \leq 0.2)$ and $Y_3(Ga_yAl_{(1-y)})_5O_{12}$:Ce $(0.4 \leq y \leq 0.5)$.

9. A color wheel comprising:

a basic phosphor having a basic emission wavelength;

a first modified phosphor and a second modified phosphor having at least one emission wavelength different from the basic emission wavelength;

wherein the basic phosphor comprises $Y_3Al_5O_{12}$, and wherein the first modified phosphor and the second modified phosphor comprise $Y_3(Ga_xAl_{(1-x)})_5O_{12}$:Ce in which gallium is doped into the basic phosphor, wherein x value of the second modified phosphor is greater than x value of the first modified phosphor, and wherein an area of the first modified phosphor is greater than an area of the basic phosphor and less than an area of the second modified phosphor.

\* \* \* \* \*